Sept. 26, 1939.    L. F. WHITNEY ET AL    2,174,299
COMBINED REFRIGERATING AND WATER HEATING UNIT AND CABINET THEREFOR
Filed April 15, 1938    6 Sheets-Sheet 1

Inventors.
Lyman F. Whitney,
William E. Whitney.
by Roberts, Cushman & Woodbury
Att'ys.

Sept. 26, 1939.  L. F. WHITNEY ET AL  2,174,299
COMBINED REFRIGERATING AND WATER HEATING UNIT AND CABINET THEREFOR
Filed April 15, 1938  6 Sheets-Sheet 2

Inventors.
Lyman F. Whitney,
William E. Whitney.
by Roberts, Cushman & Woodberg
Attys.

Sept. 26, 1939.   L. F. WHITNEY ET AL   2,174,299
COMBINED REFRIGERATING AND WATER HEATING UNIT AND CABINET THEREFOR
Filed April 15, 1938   6 Sheets-Sheet 3

Inventors.
Lyman F. Whitney,
William E. Whitney.
by Roberts, Cushman & Woodbury
Attys.

Sept. 26, 1939.  L. F. WHITNEY ET AL  2,174,299
COMBINED REFRIGERATING AND WATER HEATING UNIT AND CABINET THEREFOR
Filed April 15, 1938  6 Sheets-Sheet 4

Patented Sept. 26, 1939

2,174,299

UNITED STATES PATENT OFFICE 2,174,299

COMBINED REFRIGERATING AND WATER HEATING UNIT AND CABINET THEREFOR

Lyman F. Whitney and William E. Whitney, Cambridge, Mass., assignors, by mesne assignments, to Stator Corporation, a corporation of Rhode Island Application April 15, 1938, Serial No. 202,242

16 Claims. (Cl. 62—115)

This invention relates to a combined refrigerating and water-heating apparatus, the parts of which are arranged in a compact unit for shipment and for installation in a house or the like, such a unit being particularly adapted for assembly with the suitable cabinet. Further aspects of the invention relate to the provision of a cabinet adapted to receive such a unitary refrigerating and water-heating apparatus, and to the combination of the unit and cabinet.

The United States Patent No. 1,761,553 of Lyman F. Whitney discloses a combined water-heating and refrigerating system wherein condensing mercury vapor is effective in heating the stored water. The copending application Serial No. 192,343 of Lyman F. Whitney, filed February 24, 1938, discloses a more highly developed system of this character. The present invention particularly affords unitary apparatus of this type which may be preassembled in the factory and transported as a unit to the point of installation, there being combined with a cabinet also constructed in accordance with this invention. It is particularly desirable to provide unitary apparatus of this type separate from the cabinet but adapted readily to be combined therewith, when the apparatus includes a water storage system as well as a refrigerating system. Such apparatus is necessarily heavier than a comparable refrigerating system per se, and accordingly it is desirable to provide such apparatus so that it can readily be shipped and carried to the point of installation as a separate unit from the cabinet. Furthermore, it is more convenient to arrange the apparatus unit so that it may be provided with service connections before being housed in the cabinet. Thus, for example, the necessary connections may be made between the apparatus, the water supply duct, the gas supply pipe, and electrical line for the control devices before the cabinet is assembled with the apparatus.

While all parts of the apparatus may be permanently joined in the factory to provide the complete refrigerating and water-heating unit; if desired, the cooler may be arranged so that it may be connected to the unit after the latter has been housed in the cabinet.

In accordance with this invention, the unitary apparatus may have a base portion which preferably is adapted to rest directly on the floor. This base portion may include a heater which is effective in causing the circulation of the refrigerant. The unit also includes an upstanding portion which may be connected to one end, e. g., the rear end, of the base portion. This upstanding portion may be provided with an insulating housing in which various portions of the refrigerating system are disposed, such, for example, as one or more heat emitting portions from which heat may be transferred to the stored water. The unit also is provided with an overhanging portion connected to the upper end of the upstanding portion. This overhanging portion may provide a storage tank of substantial capacity. Preferably this tank may have curved walls and may have major horizontal and vertical dimensions of the same general order. Thus the tank may have a form somewhat resembling that of a sphere. The unit may also be provided with a cooler extending horizontally from the upstanding portion of the unit somewhat below the upper overhanging portion thereof. If the cooler is permanently joined to the unit in the factory, a closure preferably is provided for insertion in an opening in a wall of the food compartment and, in the preferred form of the invention, this closure may conveniently comprise a hollow housing to contain certain piping of the refrigerating system.

A cabinet provided for a unit of the type described may comprise a food compartment with side walls that are extended downwardly, upwardly, and rearwardly to enclose a lower chamber, a rear space, and an upper chamber, the unit being arranged so that its base portion is received in the lower chamber, so that its upstanding portion is received in the rear space, and so that its upper, overhanging portion is received in the upper chamber. The last-named chamber preferably may be provided with a detachable front wall or closure, but the upper portion of this chamber and its rear portion may conveniently be left open.

Since apparatus of this character includes a water tank of substantial capacity in the overhanging portion of the unit and since such a tank, particularly when filled with water, may be relatively heavy, the apparatus is particularly characterized by having its center of gravity disposed rather high and somewhat in front of its upstanding portion. In order, therefore, to permit maximum stability, the base portion of the unit should preferably have major horizontal dimensions of the order of the corresponding dimensions of the cabinet itself. To permit the tank to have a large capacity, the overhanging portion of the apparatus should have similar dimensions. As previously indicated, the major horizontal and vertical dimensions of the tank may be of the same general order. Thus, the height of the tank may be substantially equal to its length. Accordingly, a cabinet provided to receive such a unit may have a height above the food compartment of the order of the width of the cabinet or less. The horizontal dimensions of such a cabinet may be similar to those of a conventional refrigerator of a corresponding capacity.

The base portion of the apparatus preferably may be provided with an auxiliary heater for the water tank, this heater being connected by piping to the tank.

It is thus evident that the present invention permits the installation of a combined refrigerating and water-heating apparatus in a cabinet which will occupy approximately the same floor space as a conventional refrigerator cabinet without the water-heating system, and furthermore, that such a cabinet, while having a greater height than the conventional refrigerator cabinet, may have a height permitting its ready installation in a low-posted room.

Further advantageous features of the invention relate to structural arrangements and specific details of parts which are more fully disclosed in the following description.

Figure 1:
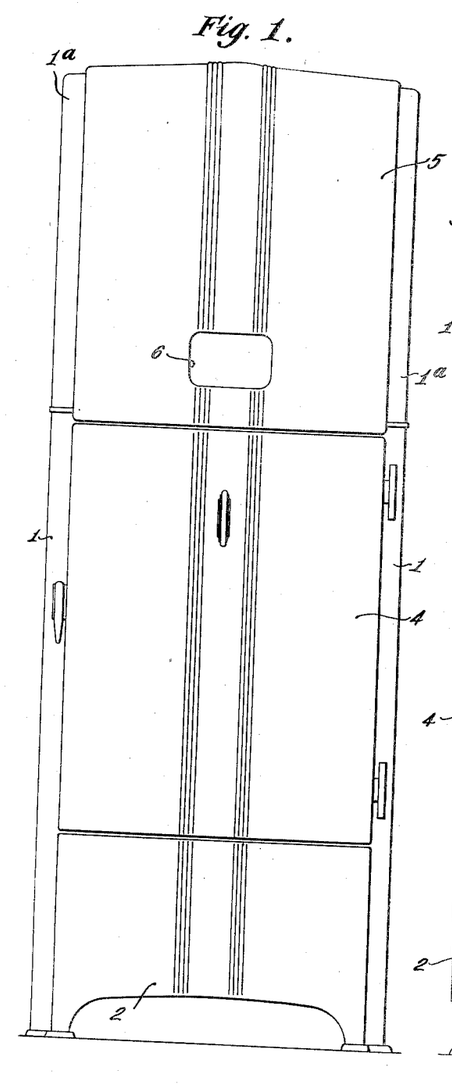
Fig. 1 is a front elevation of a cabinet for containing a unit constructed in accordance with the present invention.
Figure 2:
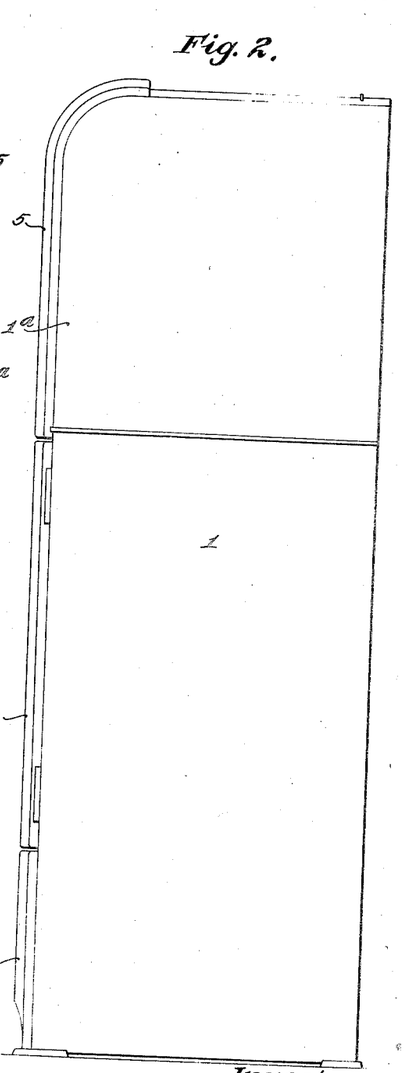
Fig. 2 is a side elevation of such a cabinet.

The accompanying drawings show a preferred arrangement of a combined refrigerating and water-heating unit assembled with a suitable cabinet. Figs. 1 and 2 show the exterior appearance of the cabinet. In general the latter, with the unit installed therein, may have the appearance of a conventional household refrigerator with the exception of having a greater height. As shown, the cabinet may have side walls 1 with a removable front panel 2 extending therebetween at the lower part of the cabinet and with a hinged door 4 disposed above the closure 2 and arranged to afford access to the food compartment. Above the food compartment, the cabinet is provided with side wall extensions 1a and with a removable front panel 5, these parts defining a chamber to enclose the hot water tank. The panel 5 preferably has a rearwardly curved upper portion as shown in Fig. 2. This panel is provided with an opening 6 to afford access to a control panel on the unit.

Figure 3:
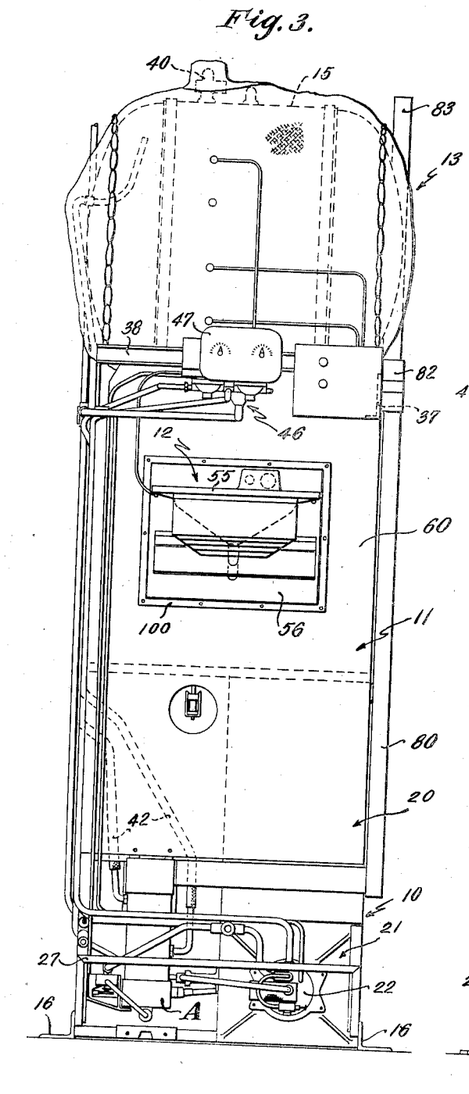
Fig. 3 is a front elevation of the unit.
Figure 4:
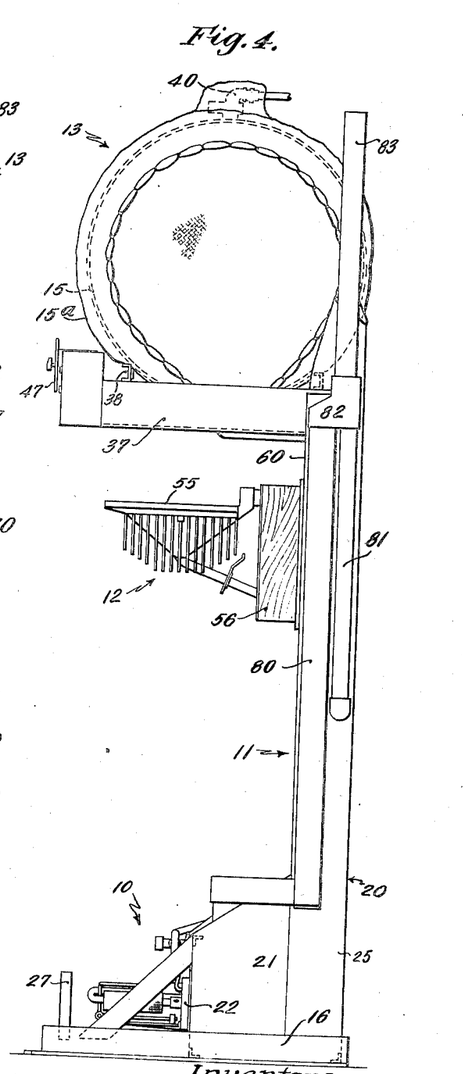
Fig. 4 is a side elevation of the same.
Figures 7, 8, 9:
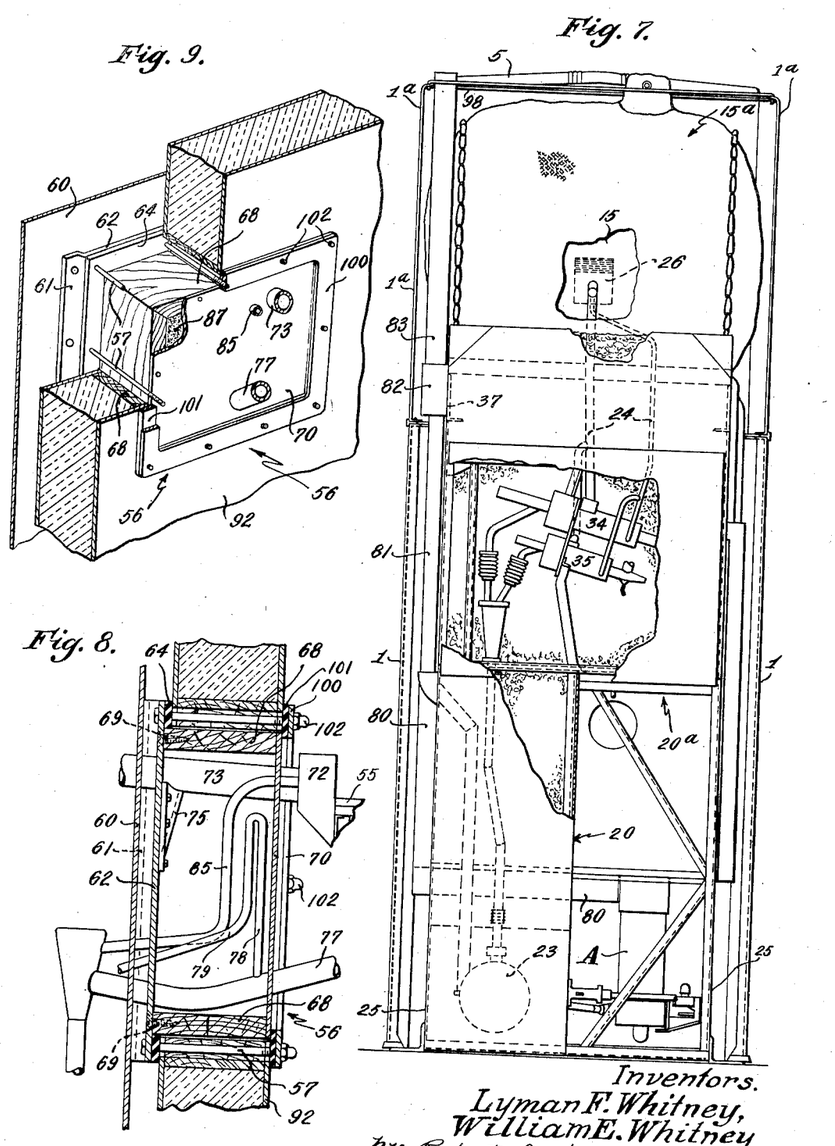
Fig. 7 is a rear view of the unit installed in the cabinet.
Fig. 8 is a section indicated by line 8—8 of Fig. 5.
Fig. 9 is a broken perspective view of the rear wall of the food compartment, also showing related parts.

Figs. 3 and 4 show the general arrangement of the removable unit which may be received in a cabinet of the form shown in Fig. 1. As is apparent from Fig. 4, the unit may be regarded as being substantially E-shaped, being provided with a horizontally extending base portion 10, with an upstanding portion 11, with an intermediate, generally horizontally disposed portion 12 and with an upper overhanging portion 13 including a water tank 15. The horizontal portion 10 may include opposite base angles 16 which form part of the framing of the unit. The front portions of these angles are connected by a cross member 27. These angles support the lower portion 21 of a housing 20 which receives the main burner assembly 22 for the mercury boiler 23 (Fig. 7). The housing 20 may contain discrete insulating material.

Figures 14, 15:
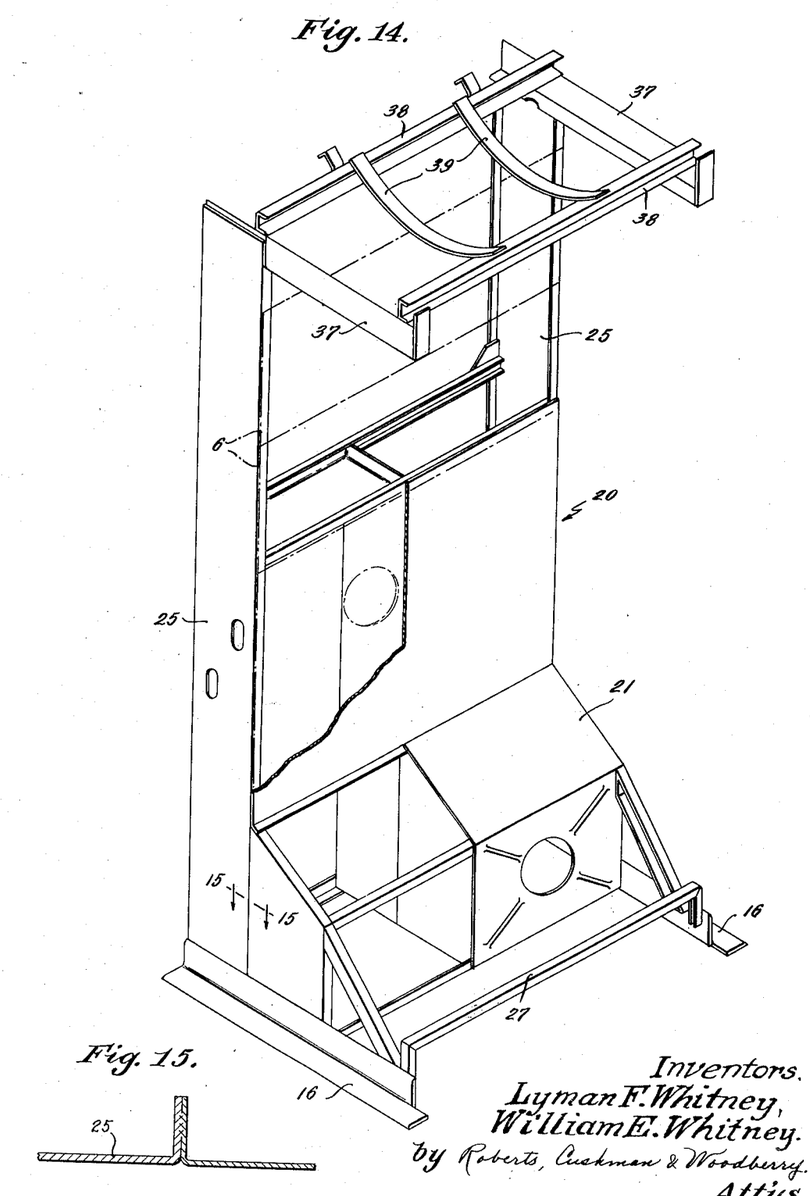
Fig. 14 is an isometric view of the framing and the casing portions of the unit.
Fig. 15 is a sectional detail indicated by line 15—15 of Fig. 14, but on an enlarged scale.

In general, this part of the frame may include upstanding channels 25 (Figs. 10 and 14) having relatively deep bight portions. Such a portion of one channel forms an end wall of the casing 20 while the corresponding portion of the other channel forms the opposite end wall of the casing for a portion of its height. Adjoining the lower part of the assembly, the insulating housing 20 may extend for but a fraction of the width of the assembly (Fig. 7), but the upper part of this housing is provided with a lateral extension 20a, so that in this region the housing has a width nearly as great as the over-all width of the unit. This part of the housing contains the aspirator assemblies 34 and 35 in which mercury vapor from the boiler 23 is effective in pumping refrigerant vapor. These assemblies include jackets which are connected by piping 24 to a heat dissipator 26 in the tank 15. The funnels of these aspirator assemblies normally operate at a relatively high temperature, thus forming heat-emitting parts of the refrigerating system. The jackets of the aspirator assembly contain fluid receiving heat from these parts, the fluid passing through the piping 24 and giving up the heat to the water in the tank 15 through the dissipator. It is evident that the casing 20, which is filled with insulating material, is effective in preventing loss of heat from the heat-emitting parts of the refrigerating system, including the aspirator assemblies 34 and 35 as well as the mercury boiler 23. A refrigerating system of this type may be made by joining together ducts, pipe sections, and the like by welding. Thus the apparatus provides a unitary and in effect integral assembly including the boiler 23, the aspirator assemblies 34 and 35, and the dissipator 26 as well as the tank 15.

Disposed beside the base portion 21 of the housing 20 is an auxiliary heater A for the hot water tank 15. This heater, for example, may be disposed substantially on a level with the main burner 22. Piping 42 (Fig. 11) extends from the auxiliary heater A through one of the channels 25 to the tank 15, thus to permit circulation of water between the auxiliary heater and the tank. It is evident that the auxiliary heater A forms part of the base assembly of the apparatus unit.

The apparatus may also include a control assembly 46 of the general type disclosed in the copending application of William E. Whitney, Serial No. 197,774, filed March 24, 1938. This assembly includes a control panel 47 and provides means to regulate the flow of gas to the main burner 22 and also means to regulate the operation of the auxiliary heater A.

Figure 5:
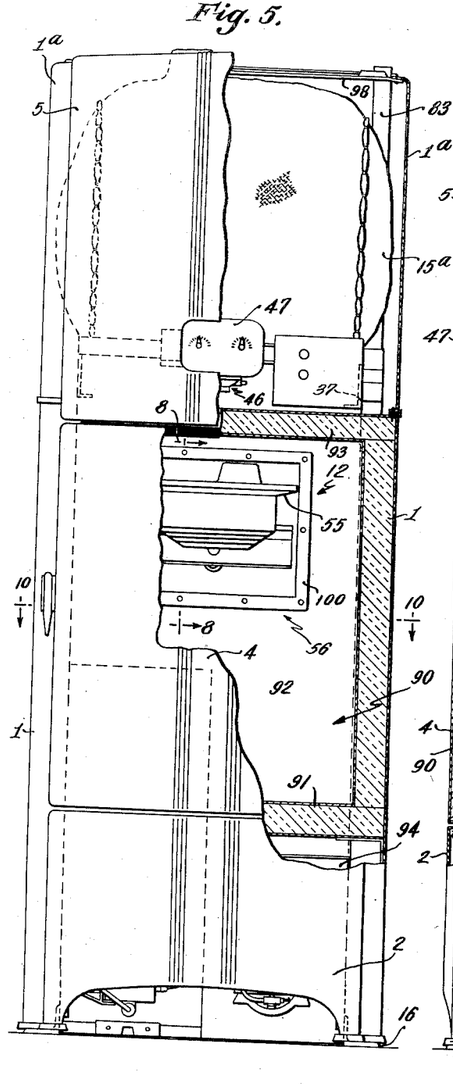
Fig. 5 is a front view of the cabinet with the unit installed therein, parts being broken away and parts being shown in elevation.
Figure 6:
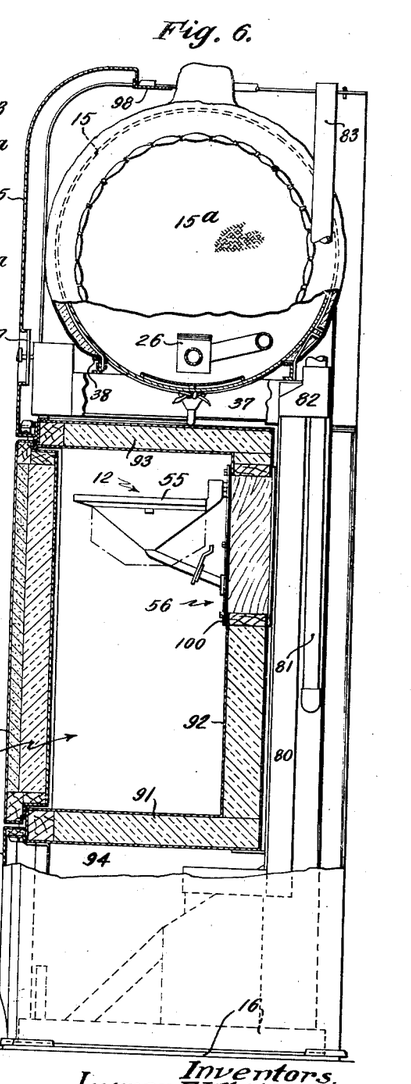
Fig. 6 is a sectional view of the combined unit and cabinet taken on a plane at right angles to the plane of Fig. 5.

The upper ends of the channels 25 are welded to angles 37 forming parts of the framing for the overhanging portion 13 of the assembly. Channels 38 are secured on the angles 37 and support metal straps 39 on which the tank 15 rests. It is thus evident that the channels 38 and the straps 39 form a cradle for supporting the tank. The latter may be provided with a covering of insulating material 15a. As shown in Figs. 5 and 6, this insulating material may conveniently be in the form of an insulating blanket surrounding the cylindrical wall of the tank and secured to large circular blanket sections by annular rows of stitching at each end of the tank. The upper part of the tank may be provided with a dump valve 40 and with connections to a suitable drain and to the pipe for supplying hot water for household uses.

At the side of the unit there may be a stack 80 to receive waste gases from the auxiliary heater A, while a stack 81 for the main burner 22 is also arranged at this side of the apparatus. These stacks may be connected to a shroud 82 which in turn may emit the gases into a single stack 83 extending to the upper part of the apparatus.

The intermediate horizontal assembly 12 includes the cooler 55 which may be of the general type disclosed in the copending application of Lyman F. Whitney, Serial No. 198,638, filed March 29, 1938, and also includes the closure 56 and associated parts. This closure is arranged to be received in an opening in the rear wall of the food compartment and preferably may be of hollow construction so that it may contain portions of the piping of the refrigerating system. A more detailed disclosure of this portion of the assembly is provided by Figs. 8 and 9.

The upstanding portion of the unit is provided with a sheet metal cover 60 to which opposite flanges 61 of a sheet metal panel 62 are secured. These flanges are offset slightly from the plane of the body portion of the panel. Studs 57 project forwardly from the margins of the body portion of the panel 62 and a rubber gasket 64 is arranged in engagement with the marginal faces of this body portion, this gasket being provided with openings through which the studs extend. A rectangular frame 68 may be secured, as by screws 69, to the body portion of the panel 62, the gasket 64 extending about this frame. The front of the frame 68 may be covered by a sheet metal panel 70.

It is evident that the panels 62 and 70 cooperate with the frame 68 in forming a hollow box-like closure. As suggested above, certain portions of the refrigerating system may conveniently be located in this closure. For example, as shown in Fig. 8, the upper part of the evaporator 55 is provided with a head 72 connected to a large-diametered vapor pipe 73 extending through the closure 56, i. e., extending through openings in the panels 62 and 70, and also extending through an opening in the metal sheet 60.

A bracket 75 is secured to the face of the panel 62 and is provided with a recessed portion to engage and support the lower part of the pipe 73. Thus an arrangement is provided whereby the weight of the cooler may be supported by the upstanding portion of the unit, the large-diametered pipe 73 being sturdy enough to support the weight of the overhanging cooler. The lower part of the cooler is connected to a combined drain and supply pipe 77 which extends through the closure 56. A supply tube for returning condensed refrigerant has a downwardly extending portion 78 connected to the pipe 77 and is provided with an upwardly extending portion 79 connected to the upper end of the portion 78. A pressure equalizing tube 85 may also extend through the closure 56. The closure 56 may conveniently be filled with discrete insulating material 87 (Fig. 9).

Figs. 5 and 6 illustrate in greater detail the arrangement of the various parts of the cabinet. As shown in these figures, the cabinet is provided with a food compartment 90 having a lower insulated wall 91, and similar rear and upper walls 92 and 93. These walls extend between the side walls 1 of the cabinet, but the lower wall 91 is spaced substantially above the lower portions of these side walls, thus cooperating therewith and with the supporting surface or floor of the room and with the removable closure 2 in enclosing a lower compartment 94 which may be open at the back. The rear wall 92 of the food compartment is spaced forwardly of the rear edges of the side walls 1 to cooperate therewith in defining a vertically extending space which communicates with the lower compartment 94. The rear wall 92 of the food compartment is provided with a suitable opening to receive the rectangular closure 56. The upper wall 93 of the food compartment may be substantially on a plane with the upper edges of the main parts of the side walls 1, as shown in Fig. 5.

The upper chamber of the apparatus, which contains the water tank 15, may be provided with the side walls 1a which are detachably secured to the upper edges of the side walls 1. The side walls 1a are connected by a sheet metal crosspiece 98 (Fig. 6), and the panel 5 is provided with an inturned upper portion which engages the front of this crosspiece. Obviously the closure 5 may be secured by detachable fastenings to this part of the cabinet and may have its edges overlapping the front edges of the side wall extensions 1a. Thus the closure 5 and the extensions 1a cooperate in enclosing the chamber for the water tank. The rear of this chamber and the major portion of its upper part may be left open, as shown.

The lower parts of the side walls 1 of the cabinet are arranged so that they may slide onto the horizontal flanges of the angles 16 at the base of the frame of the unit, as shown in Figs. 5 and 6.

When an assembly of this type is to be installed in a home, the refrigerating unit may first be located in place with the angles 16 resting on the floor. The necessary operations for installation may then be performed, such as connection of the water tank to the water lines, and connection of the gas burners to the gas line. Any other operations which are desirably performed upon installation may also take place at this time.

Thereafter the cabinet may be assembled with the unit. For this purpose the cabinet may be slid rearwardly onto the horizontal flanges of the angles 16 of the unit. As the cabinet is moved into place in this manner, the lower wall 91 of the food compartment moves over the base 10 of the unit and the cooler 55 moves through the opening in the rear wall 92 of the food compartment until the closure 56 fits within this opening Also while this movement is taking place, the water tank 15 moves into place above the upper wall 93 of the food compartment. The side walls 1ª of the upper chamber may be secured in place before the unit is assembled with the cabinet so that, as these parts are assembled with each other, the side walls 1ª move into place at opposite ends of the tank 15. The closure 5 may be assembled with these side walls either before or after the cabinet has been moved in place over the unit. It is evident that when the closure 5 is thus disposed in assembled relation, the control panel 47 of the control assembly 46 is accessible through the opening 6.

When the cabinet has been slid in place in this manner, a suitable rectangular retaining frame 100 is slipped in place over the cooler; this frame being provided with openings to receive the ends of studs 57. A gasket 101 (Fig. 8) is disposed beneath the frame 100 and between the same and adjoining portions of the sheet metal wall 70 of the closure 56 and the adjoining sheet metal of the rear wall 92 of the food compartment. Suitable retaining nuts 102 are then screwed onto the threaded ends of the studs 57, thus to compress the gaskets 64 and 101 and to hold the unit and cabinet in assembled relation.

Figures 10, 11, 12, 13:
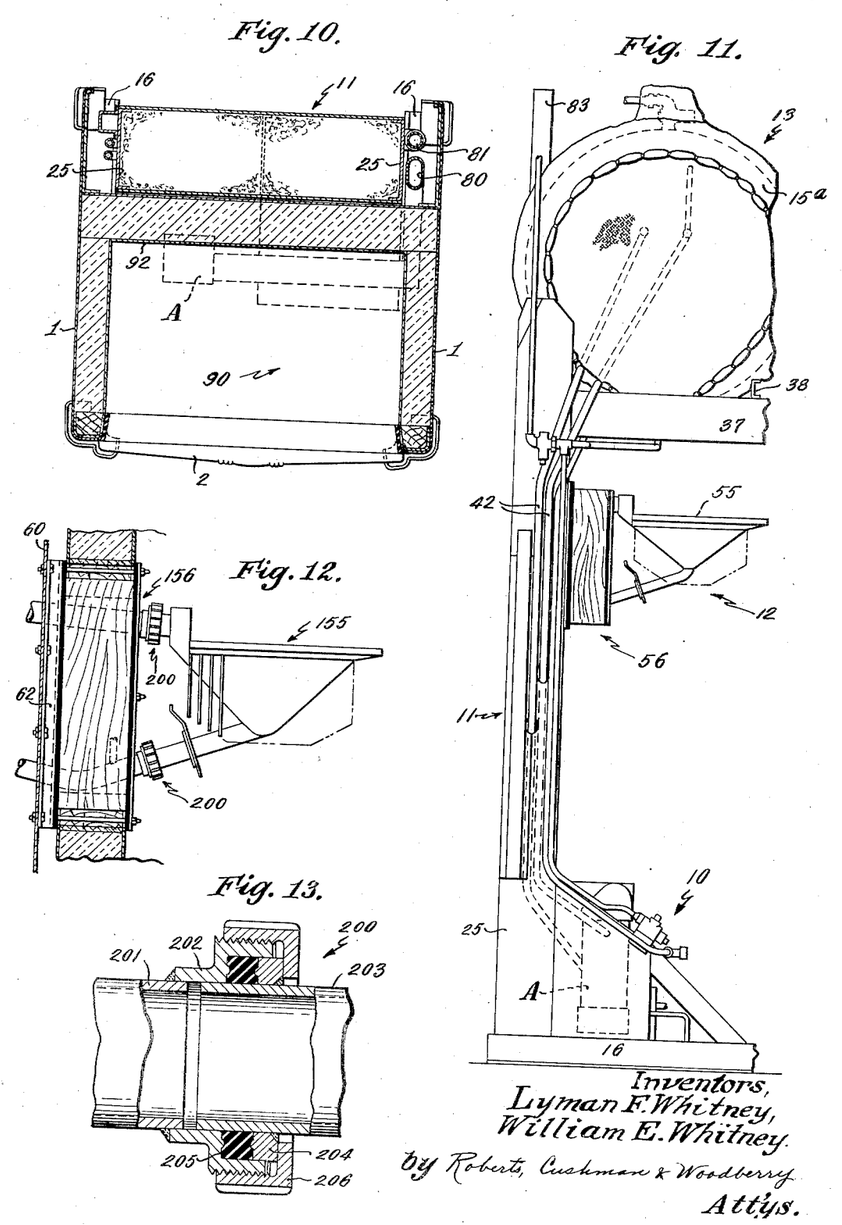
Fig. 10 is a horizontal cross section on line 10—10 of Fig. 5.
Fig. 11 is a side elevation of the unit showing the arrangement of certain water piping and having certain parts broken away.
Fig. 12 is a sectional detail of an optional arrangement of the cooler and related parts.
Fig. 13 is a sectional detail of the assembly shown in Fig. 12.

Figs. 12 and 13 show an optional arrangement of the cooler assembly. As shown in these figures, if preferred, the cooler may be detachably connected to the remainder of the unit. When such an arrangement is employed, a closure 156, similar to the closure 56, may be provided on the unit, but this closure may conveniently be made substantially narrower than the cooler. The pipe connections for the cooler extend through this closure and have couplings 200 by which they are detachably connected to pipe sections extending from the cooler 155. One of the couplings 200 is shown more in detail in Fig. 13. As shown, for example, the end of the duct 201 carries a cup-like member 202 welded thereto. This cup-like member provides an internal socket and external threads. A cooperating ring 204 is welded to the cooperating duct 203 and fits within the socket-like portion of the member 202, a gasket 205 being received in the space between the member 204, the outer face of the duct 203, and the socket member 202.

Preferably the member 202 and the collar 204 are provided with opposed annular ribs arranged to bite into the gasket 205. A cap-like nut 206 is provided with a flange to press the collar 204 against the gasket and is provided with internal threads to engage the external threads on member 202. Accordingly, as the nut 206 is tightened, the gasket 205 is firmly pressed against the outer face of the duct 203, against the member 202, and against the collar 204, thus affording an effective seal for the duct connection.

When this arrangement is employed, it is obvious that the unit may be assembled with the cabinet in the general manner which has been described and that thereafter the cooler 155 may be assembled by means of the couplings 200 with the remainder of the unit.

The copending application of Lyman F. Whitney Serial No. 211,166, filed June 1, 1938, shows an arrangement of a cabinet and refrigerating unit somewhat similar to that disclosed herein, and includes claims to such an arrangement.

It should be understood that the present disclosure is for the purpose of illustration only and that this invention includes all modifications and equivalents which fall within the scope of the appended claims.

We claim:

1. Unitary refrigerating and water heating unit comprising a frame providing a base portion to rest on the floor of the room, an upstanding portion and an overhanging portion, said overhanging portion having major horizontal dimensions of the same order as the corresponding dimensions of the base portion, said unit comprising a vaporizer and heater adjoining said base portion and a water tank on said overhanging portion, said vaporizer and tank being connected by integral duct connections, some of which are disposed in the upstanding portion of the frame.

2. Unitary refrigerating and water heating unit comprising a frame providing a base portion to rest on the floor of the room, an upstanding portion and an overhanging portion, said unit comprising a vaporizer and heater adjoining said base portion and a water tank supported by said overhanging portion, said vaporizer and tank being connected by integral duct connections, some of which are disposed in the upstanding portion of the frame, an auxiliary water heater substantially beside said vaporizer, and piping connecting said auxiliary heater to said tank.

3. The combination comprising a unitary refrigerating and water heating apparatus and a cabinet for said apparatus, said apparatus including a base portion, an upstanding portion and an overhanging portion, a heater in said base portion, a heat emitting part in said upstanding portion, said overhanging portion providing a tank for hot water, a fluid circuit to transfer heat from said heat emitting part to water in the tank, said apparatus providing insulating material around said heat emitting part, the cabinet comprising a food compartment above the base portion and below the tank, said cabinet also providing enclosures for the base portion, the upstanding portion and the overhanging portion of said apparatus.

4. The combination comprising a unitary refrigerating and water heating apparatus and a cabinet for said apparatus, said apparatus including base portion, an upstanding portion and an overhanging portion, a heater in said base portion for causing circulation of refrigerant, a heat emitting part in said upstanding portion, said overhanging portion providing a tank for hot water, a fluid circuit to transfer heat from said heat emitting part to water in the tank, said apparatus providing insulating material around said heat emitting part, the cabinet comprising a food compartment above the base portion and below the tank, said cabinet also providing enclosures for the base portion, the upstanding portion and the overhanging portion of said apparatus, and an auxiliary heater in the base portion for supplying additional heat to water in said tank.

5. The combination comprising a unitary refrigerating and water heating apparatus and a cabinet for said apparatus, said apparatus comprising a base portion, an upstanding portion and an overhanging portion, the apparatus including a refrigerating system provided with a heater in said base portion, a refrigerating circuit including parts in the upstanding portion and including a cooler below the overhanging portion, said overhanging portion including a tank for hot water receiving heat from the refrigerating system, the cabinet comprising side walls extending downwardly and upwardly from opposite sides of a food compartment and rearwardly from the same, said cabinet thus providing a food compartment and intercommunicating chambers above, below and behind the same in which the overhanging, the base and the upstanding portions of the apparatus are respectively received, said cooler being removably received in the food compartment.

6. The combination comprising a unitary refrigerating and water heating apparatus and a cabinet for said apparatus, said apparatus comprising a base portion, an upstanding portion and an overhanging portion, the apparatus including a refrigerating system provided with a heater in said base portion, a refrigerating circuit including parts in the upstanding portion and including a cooler below the overhanging portion, said overhanging portion including a tank for hot water receiving heat from the refrigerating system, said cabinet providing a food compartment and intercommunicating chambers above, below and behind the same in which the overhanging, the base, and the upstanding portions of the apparatus are respectively received, said cooler being removably received in the food compartment, said apparatus being arranged to rest on the floor, with the lower parts of the side walls of the cabinet disposed respectively at opposite sides of its base portion, the cabinet being separable from the apparatus when the former is slid forwardly relative to the apparatus.

7. The combination comprising a unitary refrigerating and water heating apparatus and a cabinet for said apparatus, said apparatus comprising a base portion, an upstanding portion and an overhanging portion, the apparatus including a refrigerating system provided with a heater in said base portion, a refrigerating circuit including parts in the upstanding portion and including a cooler below the overhanging portion, said overhanging portion including a tank for hot water receiving heat from the refrigerating system, said cabinet providing a food compartment and intercommunicating chambers above, below and behind the same in which the overhanging, the base and the upstanding portions of the apparatus are respectively received, said cooler being removably received in the food compartment, said apparatus being arranged to rest on the floor, with the lower parts of the side walls of the cabinet disposed respectively at opposite sides of its base portion, the cabinet being separable from the apparatus when the former is slid forwardly relative to the apparatus, said base portions and overhanging portions having horizontal dimensions substantially as great as those of the cabinet.

8. The combination comprising a unitary refrigerating and water heating apparatus and a cabinet for said apparatus, said apparatus comprising a base portion, an upstanding portion and an overhanging portion, the apparatus including a refrigerating system provided with a heater in said base portion, a refrigerating circuit including parts in the upstanding portion and including a cooler below the overhanging portion, said overhanging portion including a tank for hot water receiving heat from the refrigerating system, said cabinet providing a food compartment and intercommunicating chambers above, below and behind the same in which the overhanging, the base and the upstanding portions of the apparatus are respectively received, said cooler being removably received in the food compartment, said tank having major horizontal and vertical dimensions of the same general order and having convexly rounded walls.

9. The combination comprising a unitary refrigerating and water heating apparatus and a cabinet for said apparatus, said apparatus comprising base portion, an upstanding portion and an overhanging portion, the apparatus including a refrigerating system provided with a heater in said base portion, a refrigerating circuit including parts in the upstanding portion and including a cooler below the overhanging portion, said overhanging portion including a tank for hot water receiving heat from the refrigerating system, the cabinet comprising said walls extending downwardly and upwardly from opposite sides of a food compartment and rearwardly from the same, said cabinet thus providing a food compartment and intercommunicating chambers above, below and behind the same in which the overhanging, the base and the upstanding portions of the apparatus are respectively received, said cooler being removably received in the food compartment, said apparatus being arranged to rest on the floor, with the lower parts of the side walls of the cabinet disposed respectively at opposite sides of its base portion, the cabinet being separable from the apparatus when the former is slid forwardly relative to the apparatus, and an auxiliary heater for water in said tank, said heater being disposed in the base portion of the apparatus and being connected by piping to said tank, a portion of said piping forming part of the upstanding portion of the apparatus.

10. The combination comprising a unitary refrigerating and water heating apparatus and a cabinet for housing said apparatus, said cabinet being separable from the apparatus, said apparatus incuding a base portion, an upstanding portion and an overhanging portion, a heater in said base portion, a heat emitting portion in said upstanding portion, said overhanging portion providing a tank for hot water, piping to direct hot fluid from the region of said heat emitting part to said tank, said apparatus providing insulating material about said heat emitting part, the cabinet providing a food compartment above the base portion and below the tank, said cabinet also providing an enclosure for the front and sides of the base portion, of the upstanding portion, and of the overhanging portion of said apparatus.

11. The combination comprising a combined refrigerating and water heating unit and a cabinet for housing said unit, said cabinet being removable from said unit, said unit including a base portion, an upstanding portion and an overhanging portion, a heater in said base portion for causing circulation of refrigerant, a heat emitting part in said upstanding portion, said overhanging portion providing a tank for hot water, means for transferring heat from said heat emitting part to water in the tank, said apparatus providing insulating material about said heat emitting part, a cabinet comprising a food compartment above the base portion and below the tank, said cabinet also providing an enclosure for the base portion, for the upstanding portion and for the overhanging portion of said unit, an auxiliary heater in the base portion for supplying additional heat to water in said tank and piping extending from the auxiliary heater through the upstanding portion to the tank.

12. Combined refrigerating and hot water heating apparatus comprising an apparatus unit and a cabinet, said cabinet providing a food compartment, a lower compartment below the food compartment and a chamber above the food compartment, said unit including a boiler disposed in the lower compartment, a water tank disposed in the upper compartment and a frame supporting the boiler and tank and having an upstanding portion disposed outside the food compartment, said unit being separable from the cabinet.

13. Combined refrigerating and hot water heating apparatus comprising an apparatus unit and a cabinet, said cabinet providing a food compartment, a lower compartment below the food compartment, and a chamber above the food compartment, the cabinet having side walls at the sides of the food compartment, said side walls extending downwardly at each side of the lower compartment and upwardly at each side of the chamber, said walls also extending rearwardly at each side of a rear space, said unit being removable from the cabinet and including a boiler disposed in the lower compartment, a water tank disposed in the upper compartment, and a frame supporting the heater and tank and having an upstanding portion disposed in said space, the cabinet also including a removable closure for the front of said chamber, said closure having an opening therein, a control panel mounted on said unit and disposed above the food compartment, said panel being accessible through the opening in said closure.

14. Combined refrigerating and hot water heating apparatus comprising an apparatus unit and a cabinet, said cabinet providing a food compartment, a lower compartment below the food compartment, and a chamber above the food compartment, the cabinet having side walls at the sides of the food compartment, said side walls extending downwardly at each side of the lower compartment and upwardly at each side of the chamber, said walls also extending rearwardly at each side of a rear space, said unit being removable from the cabinet and including a boiler disposed in the lower compartment, a water tank disposed in the upper compartment, and a frame supporting the heater and tank and having an upstanding portion disposed in said space, the cabinet also including a removable closure, said frame including lower horizontal portions to rest on the floor of the room in which the apparatus is located, the lower parts of the side walls of the cabinet being slidably mounted on said horizontal portions whereby the cabinet may be slid forwardly relative to the unit to permit separation therefrom.

15. Unitary refrigerating and water heating unit, comprising a base including a boiler operative to cause refrigeration and to heat water, an upstanding portion connected to the base portion, a cooler spaced above the base portion and connected to the upstanding portion, a tank connected to the upper part of said upstanding portion and being spaced above the cooler, said unit being arranged so that it may be assembled with a food compartment having its upper wall between the tank and cooler and its lower wall between the cooler and base portion, as well as having an upstanding wall between said upstanding portion and said cooler.

16. Unitary refrigerating and water heating unit, comprising a boiler operative to cause refrigeration and to heat water, said unit including an upstanding portion, a cooler connected to the upstanding portion and extending therefrom, a tank connected to the upper part of said upstanding portion and being spaced above the cooler, said unit being arranged so that it may be assembled with a food compartment having its upper wall between the tank and cooler and having an upstanding wall between said upstanding portion of the unit and said cooler.

LYMAN F. WHITNEY.
WILLIAM E. WHITNEY.